UNITED STATES PATENT OFFICE.

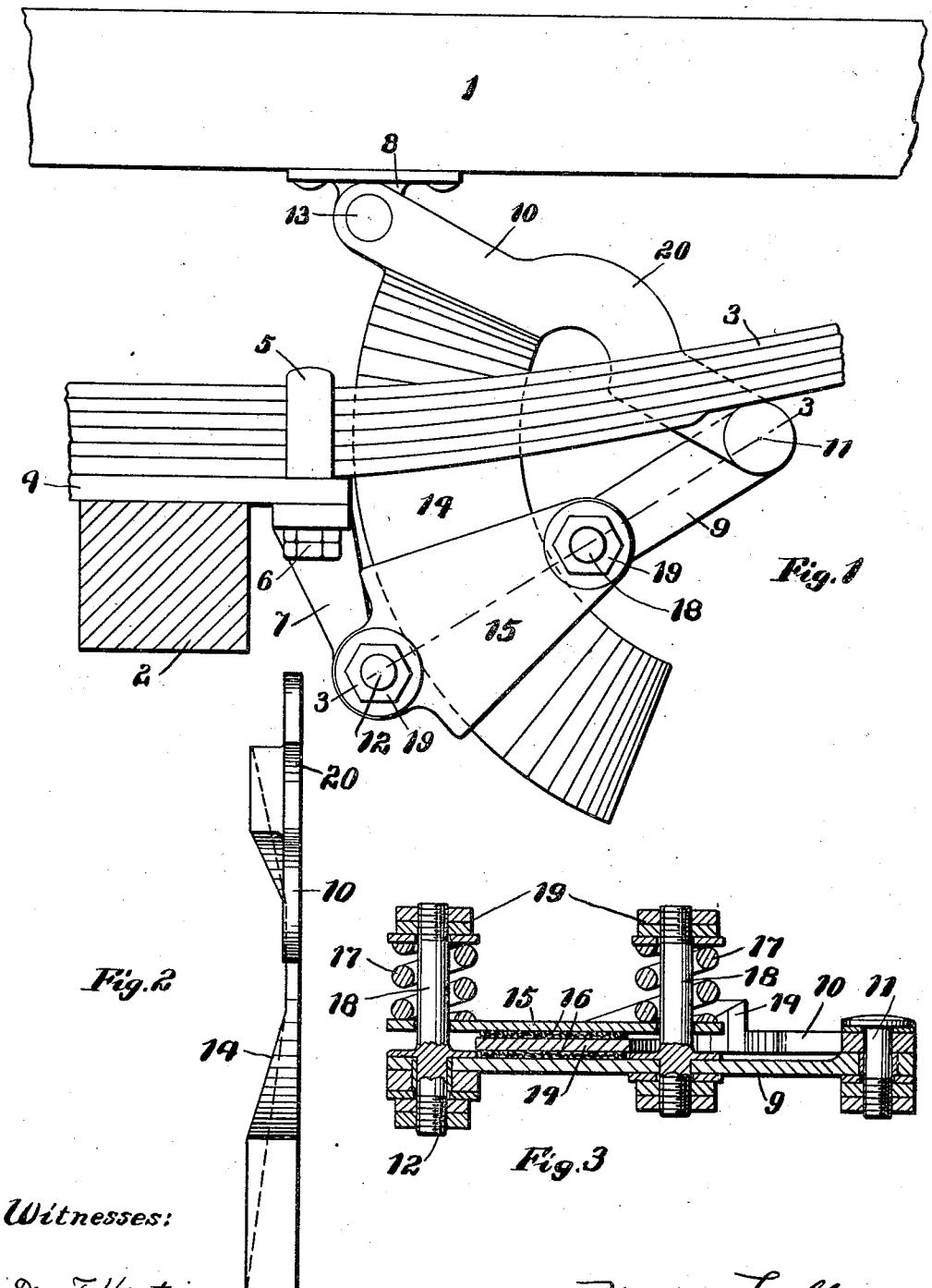

MILTON TIBBETTS, OF DETROIT, MICHIGAN, ASSIGNOR, BY MESNE ASSIGNMENTS, TO PACKARD MOTOR CAR COMPANY, OF DETROIT, MICHIGAN, A CORPORATION OF MICHIGAN.

SHOCK-ABSORBER.

992,457. Specification of Letters Patent. Patented May 16, 1911.

Application filed November 19, 1908. Serial No. 463,368.

*To all whom it may concern:*

Be it known that I, MILTON TIBBETTS, a citizen of the United States, and resident of Detroit, Wayne county, State of Michigan, have invented certain new and useful Improvements in Shock-Absorbers, of which the following is a specification.

The present invention relates to improvements in devices for relieving the shock due to the relative vibration between the body or frame and the axle of a vehicle when moving over rough or uneven surfaces, and it is particularly adapted for use on motor vehicles.

More particularly this invention relates to shock absorbers in which the dampening of the spring action is accomplished by the frictional engagement of relatively vibrating parts and its object is to simplify the construction of such devices and make them practical for adaptation to various types of motor vehicles.

Other objects and advantages will appear in the detail description following.

In the accompanying drawings, Figure 1 is a side elevation of so much of a motor as is necessary to illustrate the invention and a typical form of the invention is shown attached to such parts; Fig. 2 is an end view of the double wedge member of the device; and Fig. 3 is a section on the line 3—3 of Fig. 1.

Referring to the drawings, 1 designates a fragment of one of the side members of a vehicle frame, 2 is one of the axles of the vehicle, and 3 is a fragment of one of the springs which yieldably supports the frame from the axle.

Attached to the spring pad 4 by the spring clips 5 and nuts 6 is a bracket 7; and suitably riveted to the frame member 1 is a bracket 8.

The shock absorber or friction device consists of the members 9 and 10 pivoted together at 11 and having their free ends pivoted to the brackets 7 and 8 respectively at 12 and 13. Thus it will be seen that an upward movement of the axle 2 relative to the frame 1 will bring the pivots 12 and 13 closer together, the pivot 12 moving in an arc of a circle relative to the pivot 11; also a similar downward movement of the axle 2 will cause the pivots 12 and 13 to separate, the pivot 12 still moving in a circular path around the pivot 11.

Formed as an integral part with, or as a separate piece securely attached to, the member 10 is a double wedge-shaped piece 14 which takes the form of an arc preferably arranged concentric with the pivot 11, both its inner and outer edges being thus concentric, and one or both of its sides tapering from its ends toward the middle of the piece. It is also so arranged that one of its sides passes close to one side of the member 9 as the members 9 and 10 oscillate on the pivot 11 and it is yieldably clamped between one face of the member 9 and a plate 15 which is spring-pressed against it. Thus the plate 15 and the friction surface of the member 9 press equally on opposite sides of the wedge shaped piece 14 and the maximum amount of friction surface is thereby obtained and both sides of the piece 14 will wear equally. The face of the member 9 and the inner face of the plate 15 may be provided with friction devices in the form of an asbestos brake lining 16 or other suitable friction material as shown particularly in Fig. 3.

Preferably the side of the wedge next to the face of the member 9 is flat, all the taper being on the other side of the wedge so that the hinge 11 is not strained or thrown out of line as the device operates.

As above suggested the plate 15 is spring-pressed toward the member 9 by coil springs 17 on studs 18 projecting from the face of the member 9. In the preferred construction of one of the studs 18, it is shown as forming a continuation of the pivot bolt 12 which makes fewer parts and an easier assembled device. The tension of the springs 17 may be adjusted by the nuts 19.

Another detail of construction which is sometimes very advantageous is the offset 20 in the member 10 whereby the members 9 and 10 are permitted to fold closer together, the offset 20 surrounding the stud 18 as the members close. This gives a greater radius of action to the device without increasing the size.

From the above it will be observed that the relative movements of the axle and frame cause opening and closing movements of the members 9 and 10 and these movements are retarded or dampened by the wedge 14 between the spring-pressed plate 15 and member 9, the dampening effect increasing in both directions from the normal center of movement because of the increasing thickness of the wedge 14 toward each of its ends. The central portion of the wedge piece 14 may be made quite thin so that there will be very little if any dampening effect within a small radius at the normal position of the members.

It will be noted that in the upward movement of the axle 2 relative to the frame 1, the pivot 11 is brought closer to the frame 1 and thus the lower end of the wedge piece 14 is also raised giving a greater road clearance for this lower end when the spring 3 is compressed. This is of considerable advantage when the device is used on motor vehicles which are hung very low to the ground, and it is a marked improvement over that class of shock absorbers in which both of the friction members move in an approximately vertical plane.

Having thus described my invention, what I claim is—

1. A shock absorber comprising two members pivoted together and adapted to move in parallel planes, a concentric arc-shaped arm extending from the edge of one of said members and having one of its faces concaved or wedge-shaped tapering from the ends of the arc toward its middle, a plate on the other member between which and said other member said arm is adapted to oscillate, and springs tending to press said plate toward said other member.

2. A shock absorber comprising two members pivoted together, one of said members having a double wedge shaped arm tapering from its ends toward its middle, and the other member having a friction portion and a friction plate between which said arm is adapted to slide, a stud on said latter member at each side of the path of travel of said arm, said studs passing through said plate at different radial distances from the pivot, springs on said studs for pressing said friction portion and friction plate toward said arm, and means on said studs for adjusting the tension of the springs.

3. In a vehicle, the combination with the frame, the axle, and the springs, of a shock absorber comprising two members pivoted together and pivoted respectively to the frame and axle, a wedge-shaped piece on one of said members, the other of said members having a friction portion and a friction plate arranged to slide on said piece, studs passing through said friction devices, one of said studs forming a continuation of the bolt by which said latter member is pivoted to the axle, springs on said bolts, and nuts for adjusting the tension of said springs.

4. A shock absorber comprising two members pivoted together, an arm on one of said members, friction devices on the other of said members to engage said arm equally on opposite sides thereof, and means for increasing the frictional resistance toward either end of said arm.

5. A shock absorber comprising two members pivoted together, an arm on one of said members, friction devices on the other of said members to engage said arm equally on opposite sides thereof, and means for increasing the frictional resistance as said friction devices approach either end of said arm.

6. A shock absorber comprising two members pivoted together, an arm on one of said members, friction devices on the other of said members to engage said arm equally on opposite sides thereof, and means for increasing the frictional resistance as said friction devices recede from the middle portion of said arm.

7. A shock absorber comprising two members pivoted together, an arm extending laterally from one of said members, friction devices on the other of said members to engage said arm equally on opposite sides thereof, and means for increasing the frictional resistance toward either end of said arm.

8. A shock absorber comprising two members pivoted together, an arm on one of said members tapering toward its middle relative to the paths of travel of the longitudinal axes of said members and curved concentric with the pivot, and friction devices on the other said member for engaging said arm.

9. A shock absorber comprising two members pivoted together, an arm on one of said members near its free end tapering from the ends of the arm toward its middle relative to the paths of travel of the longitudinal axes of said members and curved concentric with the pivot, and friction devices on the other said member for engaging said arm.

10. A shock absorber comprising two members pivoted together, a concentric curved arm projecting from one of said members near its free end, said arm tapering from its ends toward its middle relative to the paths of travel of the longitudinal axes of said members, and friction devices on the other said member for engaging said arm.

11. A shock absorber comprising two members pivoted together, an arm extending from one member and having one of its sides in a plane substantially parallel with the face of said other member, the other side of said arm tapering from its ends toward its middle, and friction devices on said other member engaging both sides of said arm.

12. A shock absorber comprising two members pivoted together, an arm extending from one member substantially in the plane of oscillation thereof, the side of said arm next to the other member being substantially flat and its opposite side being tapered toward its middle, and friction devices on said other member engaging the sides of said arm.

13. In a vehicle, the combination with the frame, the axle, and the springs between the frame and axle, of a friction device comprising two members pivoted together and pivoted respectively to the frame and axle, a segmental arm on one of said members curved concentric with the common pivot and having side friction faces, one of which is tapered toward its middle, a plate on the other said member between which and said other member said arm is adapted to oscillate, and tension means for pressing said plate toward said other member.

14. In a vehicle, the combination with the frame, the axle, and the springs between the frame and axle, of a friction device comprising two members pivoted together and pivoted respectively to the frame and axle, a segmental arm on one of said members curved concentric with the common pivot and having side friction faces, one of which is tapered toward its middle, and spring-pressed means on the other said member for frictionally engaging said arm.

15. A shock absorber comprising two members pivoted together and adapted to move in substantially parallel planes, a transversely extending stud on one of said members, friction devices adjacent said stud, a spring on said stud for pressing said devices toward each other, and an arc shaped arm on the other said member adapted to oscillate between said devices.

16. A shock absorber comprising two members pivoted together and adapted to move in substantially parallel planes, a transversely extending stud on one of said members, friction devices adjacent said stud, a spring on said stud for pressing said devices toward each other, and an arc shaped arm on the other said member arranged concentric with the common pivot and tapering from the ends of the arc toward its middle, said arm adapted to oscillate between said friction devices.

17. A shock absorber comprising two members pivoted together and adapted to move in substantially parallel planes, a pair of radially spaced transversely extending studs on one of said members, friction devices between said studs, springs on said studs for pressing said devices toward each other, and an arc shaped arm on the other said member adapted to oscillate between said devices.

18. A shock absorber comprising two members pivoted together and adapted to move in substantially parallel planes, a pair of radially spaced transversely extending studs on one of said members, friction devices between said studs, springs on said studs for pressing said devices toward each other, and an arc shaped arm on the other said member arranged concentric with the common pivot and tapering from the ends of the arc toward its middle, said arm adapted to oscillate between said friction devices.

In testimony whereof I affix my signature in presence of two witnesses.

MILTON TIBBETTS.

Witnesses:
DON T. HASTINGS,
HOWARD HARKNESS.